United States Patent
Kim (10) Patent No.: US 11,340,455 B2
(45) Date of Patent: May 24, 2022

(54) VEHICLE HEAD-UP DISPLAY APPARATUS HAVING IMPROVED STRUCTURE FOR INSTALLING ASPHERICAL MIRROR

(71) Applicant: HYUNDAI MOBIS Co., Ltd., Seoul (KR)

(72) Inventor: Byung Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/130,628

(22) Filed: Dec. 22, 2020

(65) Prior Publication Data

US 2021/0191121 A1  Jun. 24, 2021

(30) Foreign Application Priority Data

Dec. 23, 2019 (KR) .................. 10-2019-0173504

(51) Int. Cl.
| | |
|---|---|
| *G02B 27/01* | (2006.01) |
| *G02B 7/182* | (2021.01) |
| *B60K 35/00* | (2006.01) |
| *G02B 5/10* | (2006.01) |

(52) U.S. Cl.
CPC .......... *G02B 27/0149* (2013.01); *B60K 35/00* (2013.01); *G02B 5/10* (2013.01); *G02B 7/182* (2013.01); *G02B 27/0101* (2013.01); *B60K 2370/1529* (2019.05); *B60K 2370/166* (2019.05); *B60K 2370/167* (2019.05); *B60K 2370/23* (2019.05)

(58) Field of Classification Search
CPC ........ G02B 27/0149; G02B 2027/0154; G02B 7/1821; G02B 7/182; G02B 7/1822; G02B 7/1824; G02B 7/1827; B60K 35/00; B60K 2370/1529
See application file for complete search history.

(56) References Cited

U.S. PATENT DOCUMENTS

| | | | |
|---|---|---|---|
| 2017/0336632 A1* | 11/2017 | Ushida | G02B 27/01 |
| 2020/0338944 A1* | 10/2020 | Henon | G02B 27/0149 |

FOREIGN PATENT DOCUMENTS

| | | | |
|---|---|---|---|
| JP | 2018-192962 | 12/2018 | |
| WO | WO-2020129777 A1 * | 6/2020 | B60K 35/00 |

OTHER PUBLICATIONS

"Load Characteristics and Sensitivity Analysis for an Automotive Clutch Diaphragm Spring" with English abstract by Byoungsoo Lee, Transaction of the Korean Society of Automotive Engineers 14(1), Jan. 2006, 54-59p.

* cited by examiner

*Primary Examiner* — Ryan D Howard
(74) *Attorney, Agent, or Firm* — H.C. Park & Associates, PLC (57) ABSTRACT

A vehicle head-up display apparatus having an improved structure for installing an aspherical mirror so that a state in which an aspherical mirror reflecting light is stably installed is maintained includes mount parts formed at both sides of a lower case, rotatable protrusions seated in the mount parts and vertically rotated are formed at both sides of an aspherical mirror, and pressing members configured to fixedly press the rotatable protrusions against the mount parts are installed on a screen part.

16 Claims, 8 Drawing Sheets

VEHICLE HEAD-UP DISPLAY APPARATUS HAVING IMPROVED STRUCTURE FOR INSTALLING ASPHERICAL MIRROR

CROSS-REFERENCE TO RELATED APPLICATION

This application claims priority to and the benefit of Korean Patent Application No. 10-2019-0173504, filed on Dec. 23, 2019, which is hereby incorporated by reference for all purposes as if set forth herein.

BACKGROUND

Field

Exemplary embodiments relate to a vehicle head-up display apparatus having an improved structure for installing an aspherical mirror, and particularly, to a vehicle head-up display apparatus having an improved structure for installing an aspherical mirror so that a state in which an aspherical mirror reflecting light is stably installed is maintained.

Discussion of the Background

Recently, the automobile market is rapidly growing with a trend of favoring intelligent vehicles having advanced information technology (IT) and convenient functions in addition to improving the original functions of vehicles.

In this trend, electronization of vehicles is proliferating, and functions in which IT and wireless communication technology are combined are rapidly increasing.

Particularly, products for supporting the stability and convenience of drivers are being released, and a head-up display (HUD) which is one of the products drawing attention with various product lines.

Generally, a vehicle head-up display is an apparatus configured to display an image containing speed, remaining fuel, road guide information, and the like on a windshield which is a front window of a vehicle.

In the vehicle head-up display apparatus, a light-emitting display device generates the various types of vehicle information using light, the generated light is reflected upward by an aspherical mirror, and thus the various types of vehicle information are displayed on the front window glass.

The aspherical mirror is assembled with a case and the like forming the head-up display apparatus, in this case, the aspherical mirror is moved due to an external impact, and thus there is a problem in that noise is generated or the aspherical mirror is damaged.

Although various structures are being developed to solve the problem, they are insufficient for completely solving the problem.

The above information disclosed in this Background section is only for enhancement of understanding of the background of the invention and, therefore, it may contain information that does not constitute prior art.

SUMMARY

Exemplary embodiments of the present invention is directed to providing a vehicle head-up display apparatus having an improved structure for installing an aspherical mirror, which is capable of preventing noise generation or damage to an aspherical mirror while the aspherical mirror is moved due to an external impact.

To solve the problems, provided is a vehicle head-up display apparatus having an improved structure for installing an aspherical mirror of the present invention, and the vehicle head-up display apparatus includes a lower case, a screen part disposed inside the lower case, and an aspherical mirror disposed to be vertically rotatable in the lower case, wherein a mount part is formed at each of both sides of the lower case, a rotatable protrusion seated on the mount part and vertically rotated is formed at each of both sides of the aspherical mirror, a pressing member configured to fixedly press the rotatable protrusion against the mount part is formed on the screen part.

The rotatable protrusion may include a column part protruding from each of the both sides of the aspherical mirror, and a rotatable sphere formed to protrude from the column part, and having a spherical shape whose diameter is greater than a diameter of the column part, wherein the rotatable sphere may be seated on the mount part, and the pressing member may press the rotatable sphere against the mount part.

The mount part may be formed in a V shape by connecting a first inclined surface and a second inclined surface, which are inclined in opposite directions, an upper end of the rotatable sphere may protrude further upward than an upper end of the mount part, and the pressing member may be disposed on the rotatable sphere, and press the upper end of the rotatable sphere against the mount part to restrict a vertical displacement of the rotatable protrusion.

The pressing member may be disposed on the rotatable sphere, and the pressing member may be elastically deformed in a vertical direction, in which the rotatable sphere is disposed, by an external force.

The pressing member may consist of a leaf spring.

A through hole may be formed in a center of the pressing member, and an upper end of the rotatable sphere may be inserted into the through hole.

An inner side, which is in contact with the rotatable sphere, of the pressing member may be bent further downward than an outer side thereof so that a downward pressing force may be applied to the rotatable sphere.

The pressing member may be provided as a plurality of pressing members which are vertically stacked.

A plurality of snap fits configured to fix the pressing member may be formed on the screen part.

A grease storage part filled with grease may be formed on the screen part, a lower portion of the grease storage part may be open, the pressing member may be installed under the grease storage part, and the grease filling the grease storage part may be applied onto a surface of the rotatable sphere through the through hole.

A paddle protrusion passing through the through hole may be formed on the upper end of the rotatable sphere, and when the rotatable protrusion rotates, the paddle protrusion may push and move the grease filling the grease storage part.

A passage groove may be formed in the upper end of the rotatable sphere at each of both sides of the paddle protrusion to extend in a rotational direction of the rotatable sphere, and when the rotatable protrusion rotates, the grease pushed by the paddle protrusion may be discharged to a lower portion of the rotatable sphere through the passage grooves.

A passage groove may be formed in the upper end of the rotatable sphere to extend in a rotational direction of the rotatable sphere, and when the rotatable protrusion rotates, the grease filling the grease storage part may be discharged to a lower portion of the rotatable sphere through the passage groove.

In addition, to solve the problems, provided is a vehicle head-up display apparatus having an improved structure for installing an aspherical mirror of the present invention, the vehicle head-up display apparatus includes a lower case, a screen part disposed inside the lower case, and an aspherical mirror disposed to be vertically rotatable in the lower case, wherein a mount part is formed at each of both sides of the lower case, a rotatable protrusion seated on the mount part and vertically rotated is formed at each of both sides of the aspherical mirror, the rotatable protrusion is restricted between the mount part and the screen part, a grease storage part filled with grease is formed on the screen part, a lower portion of the grease storage part is open and is disposed on the rotatable protrusion, and the grease filling the grease storage part is supplied to the rotatable protrusion.

A pressing member fixedly pressing the rotatable protrusion against the mount part may be installed on the screen part.

The pressing member may be installed under the grease storage part and disposed on the rotatable protrusion, and the grease filling the grease storage part may be applied onto the rotatable protrusion through a through hole formed in the pressing member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 1:
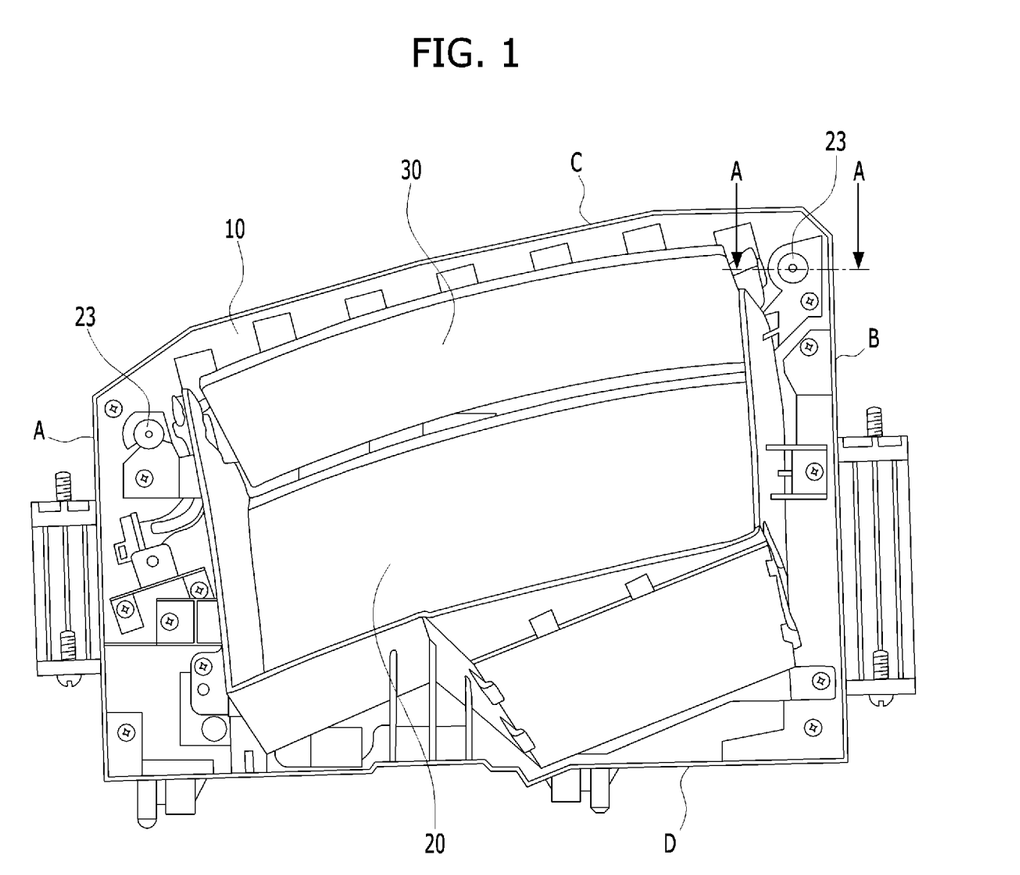
FIG. 1 is a perspective view illustrating main components of a head-up display apparatus according to an embodiment of the present invention.
Figure 2:
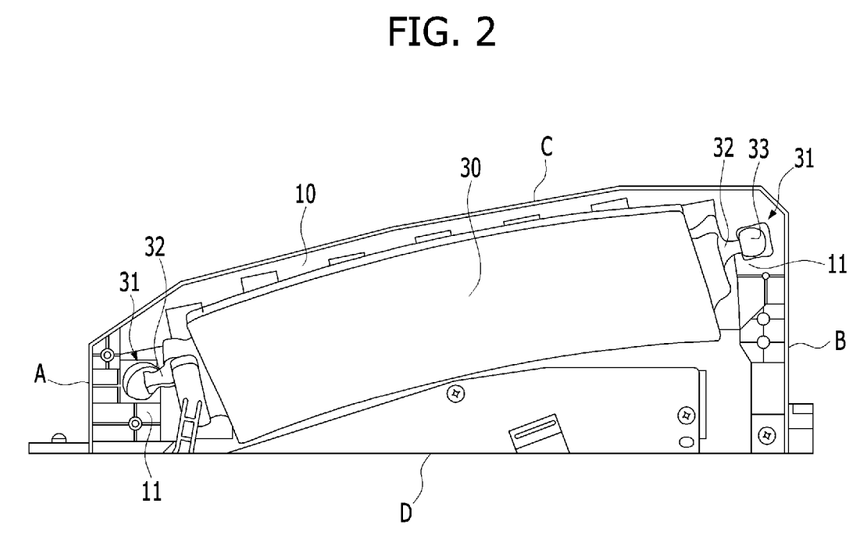
FIG. 2 is an enlarged view illustrating an aspherical mirror part in a state in which a screen part is removed from FIG. 1.
Figure 3:
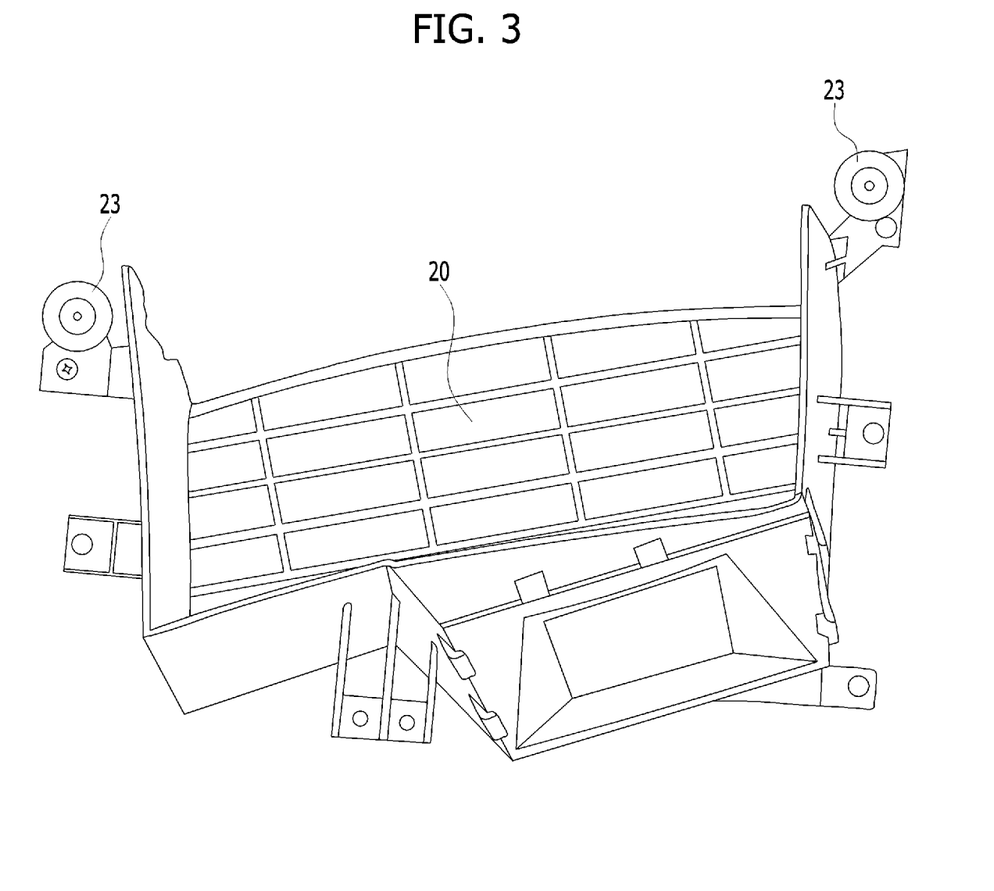
FIG. 3 is a perspective view illustrating the screen part according to the embodiment of the present invention.

As illustrated in FIGS. 1 to 3, a vehicle head-up display apparatus having an improved structure for installing an aspherical mirror of the present invention includes a lower case 10, a screen part 20, and an aspherical mirror 30.

The lower case 10 refers to a case positioned at a lower portion of the case of the head-up display apparatus.

The screen part 20 is disposed inside the lower case 10. The lower case 10 may include a first side A and a second side B on opposing ends of the aspherical mirror 30. The lower case may have additional sides C and D. The aspherical mirror 30 may have a curved rectangular shape of a rectangle with long sides adjacent side C, and short sides adjacent sides A and B.

The aspherical mirror 30 is disposed to be vertically rotatable at sides A and B of the screen part 20 in the lower case 10.

The aspherical mirror 30 reflects light (vehicle information, an image, and the like) generated by a light-emitting display device, which is not shown in the drawings, upward so that the light (vehicle information, an image, and the like) is displayed on a front window glass of a vehicle.

As illustrated in FIG. 2, mount parts 11 are formed adjacent both sides A and B of the lower case 10.

In addition, rotatable protrusions 31 seated on the mount parts 11 and vertically rotated are formed on both sides of the aspherical mirror 30 adjacent sides A and B of the lower case 10.

Because the rotatable protrusions 31 are seated on the mount parts 11, the aspherical mirror 30 can be vertically rotated with respect to the lower case 10 in which the mount parts 11 are formed.

Figure 7:
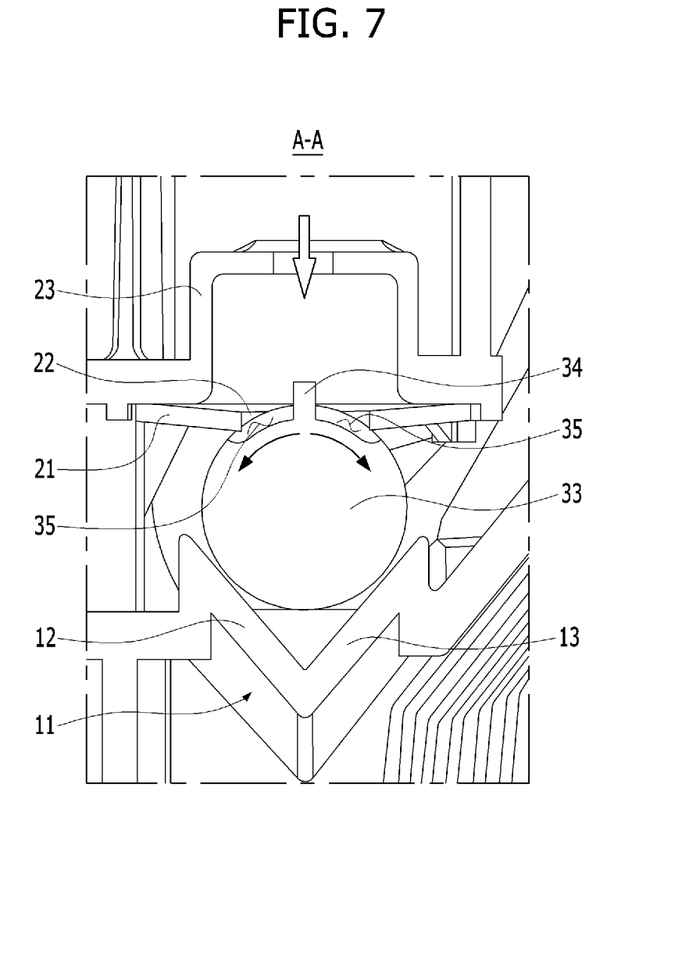
FIG. 7 is a cross-sectional view taken along line A-A of FIG. 1.

As illustrated in FIG. 7, the mount part 11 is formed in a V shape in the present embodiment, but is not limited thereto.

In the present embodiment, the mount part 11 is formed in the V shape by connecting a first inclined surface 12 and a second inclined surface 13, which are inclined in opposite directions, as illustrated in FIG. 7.

Figure 6:
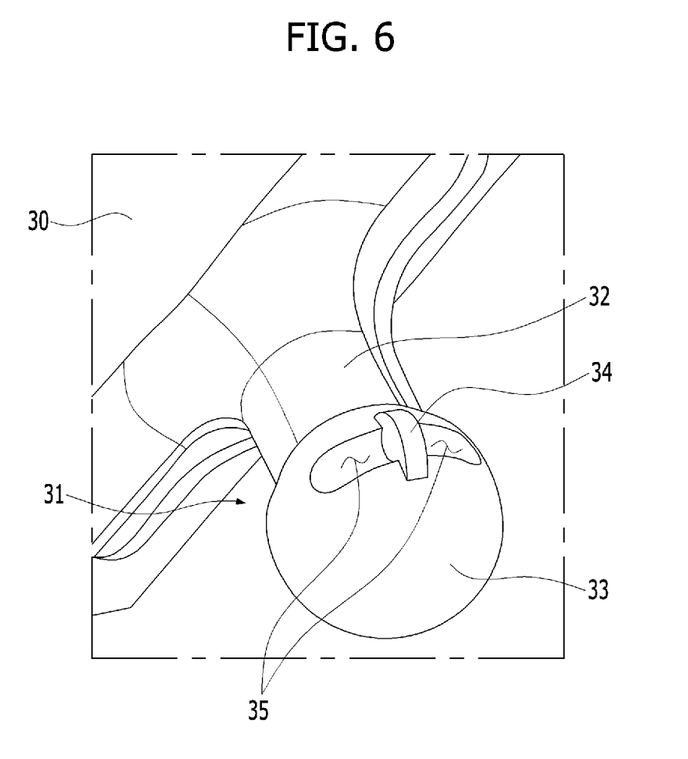
FIG. 6 is a perspective view illustrating a rotatable protrusion according to the embodiment of the present invention.

As illustrated in FIG. 6, the rotatable protrusions 31 are provided with a column part 32 and a rotatable sphere 33.

The column part 32 is a part protruding from both sides of the aspherical mirror 30 adjacent sides A and B of the lower case 10.

The rotatable sphere 33 is formed in a spherical shape protruding from the column part 32.

A diameter of the rotatable sphere 33 is greater than a diameter of the column part 32.

As illustrated in FIG. 7, the rotatable sphere 33 of the rotatable protrusion 31 is rotatably seated on the mount part 11.

An upper end of the rotatable sphere 33 seated on the mount part 11 protrudes further upward than an upper end of the mount part 11.

The screen part 20 is disposed on the rotatable sphere 33 seated on the mount part 11 to restrict the vertical displacement of the rotatable protrusion 31, specifically, the rotatable sphere 33 seated on the mount part 11.

That is, as illustrated in FIG. 7, the rotatable sphere 33 is disposed between the mount part 11 and the screen part 20 so that the vertical displacement thereof is restricted.

Accordingly, when an external impact is applied, a position of the rotatable protrusion 31 is not primarily changed by the screen part 20, and thus the displacement thereof is restricted.

Figure 4:
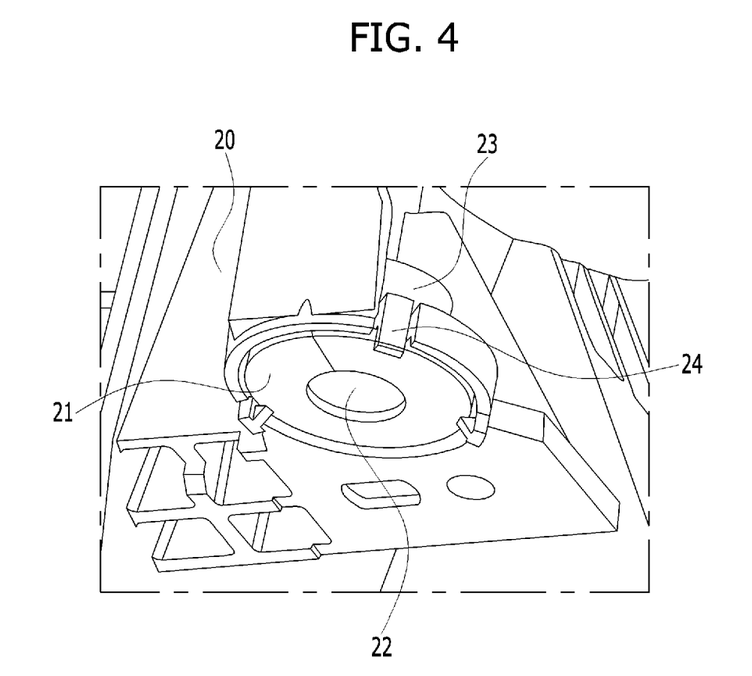
FIG. 4 is a perspective view illustrating a grease storage part and a pressing member of the screen part according to the embodiment of the present invention.
Figure 5:
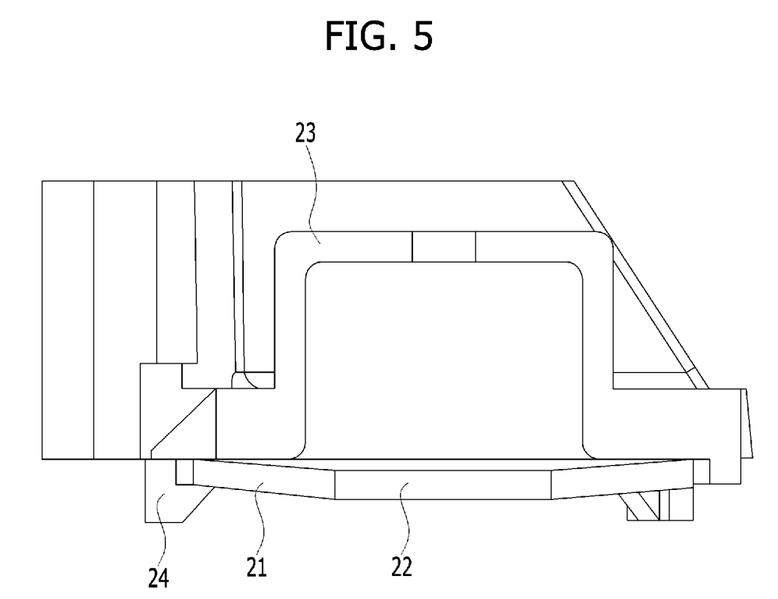
FIG. 5 is a cross-sectional view illustrating the grease storage part and the pressing member according to the embodiment of the present invention.

As illustrated in FIGS. 4, 5 and 7, the present invention includes pressing members 21 mounted on the screen part 20 and fixedly pressing the rotatable protrusions 31 against the mount parts 11.

The pressing member 21 may press the rotatable protrusion 31 having one of various shapes, and in the present embodiment, the pressing member 21 presses the rotatable sphere 33 against the mount part 11.

More specifically, as illustrated in FIG. 7, the pressing member 21 is disposed on the rotatable sphere 33 to press the upper end of the rotatable sphere 33 against the mount part 11 so as to restrict the vertical displacement of the rotatable protrusion 31.

Because the pressing member 21 is formed to be elastically deformed in a vertical direction, in which the rotatable sphere 33 is disposed, by an external force, the pressing member 21 continuously and fixedly presses the rotatable sphere 33 against the mount part 11.

As illustrated in FIGS. 4 and 5, the pressing member 21 may be provided as a leaf spring.

More specifically, the pressing member 21 is provided as a plate spring which is one of leaf springs.

A through hole 22 is formed in a center of the pressing member 21, and the upper end of the rotatable sphere 33 is inserted into the through hole 22.

As illustrated in FIGS. 5 and 7, an inner side, which is in contact with the rotatable sphere 33, of the pressing member 21 is bent more downward than an outer side thereof, and thus a downward pressing force is applied to the rotatable sphere 33.

As illustrated in FIG. 7, in a state in which the rotatable sphere 33 is disposed to be inserted between the pressing member 21 and the mount part 11, when the screen part 20 is coupled to the lower case 10, the pressing member 21 slightly presses the rotatable sphere 33 downward while being elastically deformed upward.

Accordingly, an elastic restoring force, that is, a pressing force, always pressing the rotatable sphere 33 downward is generated by the pressing member 21, and thus the rotatable sphere 33 is not moved arbitrarily and a state in which the rotatable sphere 33 is assembled with the mount part 11 can be maintained.

In addition, when an external impact is applied, the rotatable sphere 33 is moved while elastically deforming the pressing member 21 in the vertical direction and is quickly restored to an original position by the elastic restoring force of the pressing member 21.

Although only one pressing member 21 is illustrated in the drawings of the present embodiment, a plurality of pressing members 21 may also be vertically stacked in the same direction or different directions as necessary.

In addition, as illustrated in FIGS. 4 and 5, a plurality of snap fits 24 are formed on the screen part 20, and the pressing member 21 is fitted into the plurality of the snap fits 24 and fixed to the screen part 20.

Meanwhile, as illustrated in FIGS. 3 to 5, grease storage parts 23 filled with grease may be formed on the screen part 20.

As illustrated in FIG. 7, a lower portion of the grease storage part 23 is open, and the pressing member 21 is installed under the grease storage part 23.

A hole for filling the grease storage part with grease from the outside to the inside is formed in an upper portion of the grease storage part.

The grease filling the grease storage part 23 is applied onto a surface of the rotatable sphere 33 through the through hole 22 formed in the pressing member 21, and thus the aspherical mirror 30 is smoothly rotated.

A paddle protrusion 34 inserted through the through hole 22 is formed on the upper end of the rotatable sphere 33.

When the rotatable protrusion 31 rotates, the paddle protrusion 34 pushes and moves the grease filling the grease storage part 23 in the leftward and rightward directions.

As described above, when the rotatable protrusion 31 rotates, because the paddle protrusion 34 pushes the grease, the grease in the grease storage part 23 can be effectively applied onto the rotatable sphere 33.

In order to effectively discharge the grease to the rotatable protrusion 31, passage grooves 35 are formed in the upper end of the rotatable sphere 33 to extend in a rotational direction of the rotatable sphere 33 at both sides of the paddle protrusion 34.

When the rotatable protrusion 31 rotates, the grease pushed by the paddle protrusion 34 is discharged to a lower portion of the rotatable sphere 33 through the passage grooves 35.

Figure 8:
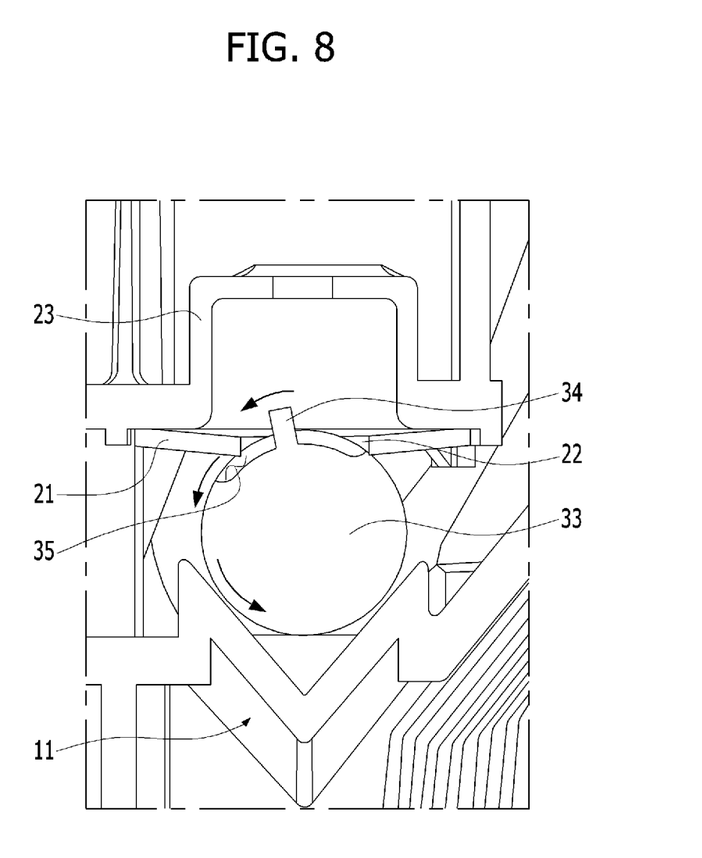
FIG. 8 is a cross-sectional view illustrating a state in which the rotatable protrusion rotates in a leftward direction to discharge grease in FIG. 7.
Figure 9:
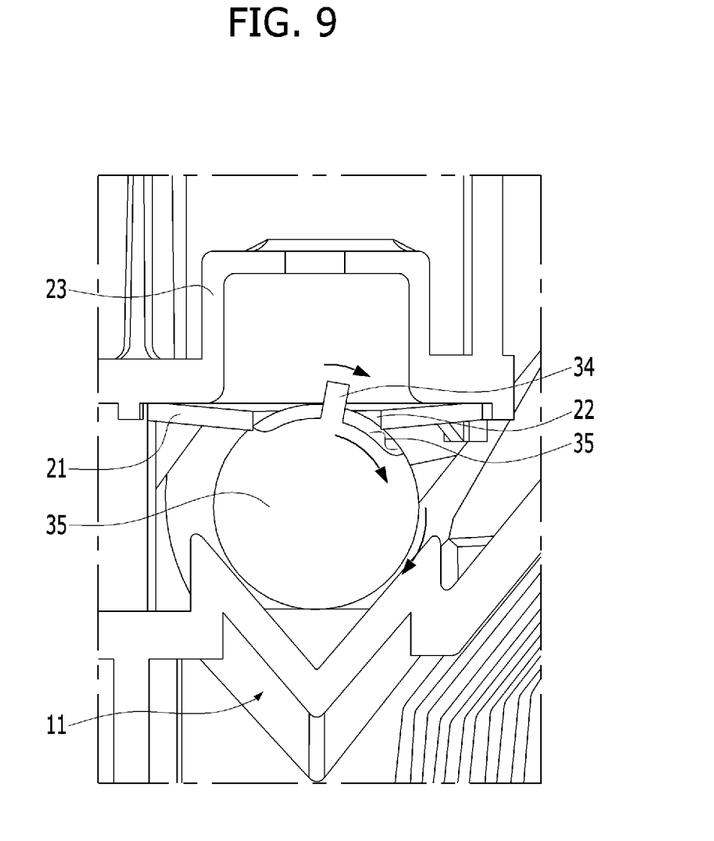
FIG. 9 is a cross-sectional view illustrating a state in which the rotatable protrusion rotates in a rightward direction to discharge the grease in FIG. 7.

Due to such a structure, when the aspherical mirror 30 is rotated to a parking or tilting position and the rotatable protrusion 31 is rotated, the grease filling the grease storage part 23 is pushed by the paddle protrusion 34 and automatically discharged to the rotatable sphere 33 and the mount part 11 through the passage grooves 35 as illustrated by arrows in FIGS. 8 and 9.

The grease discharged through the passage grooves 35 may be applied onto the rotatable sphere 33 and the mount part 11 to reduce wear of the rotatable sphere 33 due to rotation thereof when the rotatable sphere 33 rotates on the mount part 11.

In some cases, only the passage grooves 35 may be formed in the upper end of the rotatable sphere 33 without the paddle protrusion 34.

As described above, in the present invention, because the pressing member 21 fixedly presses the rotatable protrusion 31 against the mount part 11, the rotatable protrusion 31 can be stably disposed on the mount part 11, and even when an external impact is applied thereto, noise generation or damage to the rotatable protrusion 31 can be prevented while the rotatable protrusion 31 moves in the mount part 11.

In addition, because the grease is automatically supplied to the surface of the rotatable sphere 33 when the rotatable protrusion 31 rotates, the rotatable protrusion 31 can be smoothly rotated.

The following effects can be obtained according to the above-described vehicle head-up display apparatus having an improved structure for installing an aspherical mirror of the present invention.

In the present invention, since a pressing member fixedly presses a rotatable protrusion against a mount part, the rotatable protrusion can be stably disposed on the mount part, and even when an external impact is applied thereto, noise generation or damage to the rotatable protrusion can be prevented while the rotatable protrusion is moved in the mount part.

In addition, when the rotatable protrusion rotates, since grease is automatically supplied to a surface of the rotatable sphere, the rotatable protrusion can be smoothly rotated.

The vehicle head-up display apparatus having an improved structure for installing an aspherical mirror of the present invention is not limited to the above-described embodiments and may be variously modified and implemented in a range allowed by the technical spirit.

What is claimed is:

1. A vehicle head-up display apparatus having an improved structure configured to install an aspherical mirror, the vehicle head-up display apparatus comprising:
a lower case having two sides on opposing ends of the aspherical mirror;
a screen part disposed inside the lower case; and
an aspherical mirror disposed to be vertically rotatable in the lower case,
wherein a mount part is formed on each of both sides of the lower case,
a rotatable protrusion seated in the mount part and configured to be vertically rotated, the rotatable protrusion being formed at both sides of the aspherical mirror, and
a pressing member formed on the screen part and configured to fixedly press the rotatable protrusion against the mount part.

2. The vehicle head-up display apparatus of claim 1, wherein the rotatable protrusion includes:
a column part protruding from each of the both sides of the aspherical mirror; and
a rotatable sphere formed to protrude from the column part, and having a spherical shape whose diameter is greater than a diameter of the column part,
wherein the rotatable sphere is seated in the mount part, and
wherein the pressing member presses the rotatable sphere against the mount part.

3. The vehicle head-up display apparatus of claim 2, wherein:
the mount part is formed in a V shape by connecting a first inclined surface and a second inclined surface which are inclined in opposite directions;
an upper end of the rotatable sphere protrudes further upward than an upper end of the mount part; and
the pressing member is disposed on the rotatable sphere and presses the upper end of the rotatable sphere against the mount part to restrict a vertical displacement of the rotatable protrusion.

4. The vehicle head-up display apparatus of claim 2, wherein:
the pressing member is disposed on the rotatable sphere; and
the pressing member is elastically deformed in a vertical direction, in which the rotatable sphere is disposed, by an external force.

5. The vehicle head-up display apparatus of claim 4, wherein the pressing member includes a leaf spring.

6. The vehicle head-up display apparatus of claim 5, further comprising:
a through hole formed in a center of the pressing member and an upper end of the rotatable sphere is inserted into the through hole.

7. The vehicle head-up display apparatus of claim 6, wherein an inner side, which is in contact with the rotatable sphere, of the pressing member is bent further downward than an outer side thereof so that a downward pressing force is applied to the rotatable sphere.

8. The vehicle head-up display apparatus of claim 7, wherein the pressing member is provided as a plurality of pressing members which are vertically stacked.

9. The vehicle head-up display apparatus of claim 5, further comprising:

a plurality of snap fits formed on the screen part and configured to fix the pressing member in place.

10. The vehicle head-up display apparatus of claim 6, further comprising:
a grease storage part filled with grease formed on the screen part, wherein a lower portion of the grease storage part is open,
wherein the pressing member is installed under the grease storage part; and
wherein the grease filling the grease storage part is applied onto a surface of the rotatable sphere through the through hole.

11. The vehicle head-up display apparatus of claim 10, further comprising:
a paddle protrusion formed on the upper end of the rotatable sphere and inserted through the through hole,
wherein when the rotatable protrusion rotates, the paddle protrusion pushes and moves the grease filling the grease storage part.

12. The vehicle head-up display apparatus of claim 11, further comprising:
a passage groove formed in the upper end of the rotatable sphere at each of both sides of the paddle protrusion to extend in a rotational direction of the rotatable sphere,
wherein when the rotatable protrusion rotates, the grease pushed by the paddle protrusion is discharged to a lower portion of the rotatable sphere through the passage grooves.

13. The vehicle head-up display apparatus of claim 10, further comprising:
a passage groove formed in the upper end of the rotatable sphere to extend in a rotational direction of the rotatable sphere,
wherein when the rotatable protrusion rotates, the grease filling the grease storage part is discharged to a lower portion of the rotatable sphere through the passage groove.

14. A vehicle head-up display apparatus having an improved structure for installing an aspherical mirror, the vehicle head-up display apparatus comprising:
a lower case having at least two sides;
a screen part disposed inside the lower case;
an aspherical mirror disposed to be vertically rotatable in the lower case;
a plurality of mount parts formed at each of two sides of the lower case;
a plurality of rotatable protrusions formed at each of both sides of the aspherical mirror, seated on the mount parts and configured to be vertically rotated,
a grease storage part on the screen part filled with grease,
wherein the rotatable protrusions are restricted between the mount parts and the screen part,
wherein a lower portion of the grease storage part is open and is disposed on the rotatable protrusion, and
wherein the grease filling the grease storage part is supplied to the rotatable protrusion.

15. The vehicle head-up display apparatus of claim 14, further comprising:
a pressing member installed on the screen part and configured to fixedly press the rotatable protrusion against the mount part.

16. The vehicle head-up display apparatus of claim 15, wherein:
the pressing member is installed under the grease storage part and disposed on the rotatable protrusion; and the grease filling the grease storage part is applied onto the rotatable protrusion through a through hole formed in the pressing member.

\* \* \* \* \*